United States Patent
Yu et al.

(10) Patent No.: US 10,423,195 B2
(45) Date of Patent: Sep. 24, 2019

(54) VERIFICATION METHOD, DEVICE AND COMPUTER-READABLE STORAGE MEDIUM BASED ON A FLEXIBLE DISPLAY SCREEN

(71) Applicant: Beijing Xiaomi Mobile Software Co., Ltd., Haidian District, Beijing (CN)

(72) Inventors: Kuifei Yu, Beijing (CN); Ran Xu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 127 days.

(21) Appl. No.: 15/592,219

(22) Filed: May 11, 2017

(65) Prior Publication Data

US 2018/0113489 A1 Apr. 26, 2018

(30) Foreign Application Priority Data

Oct. 26, 2016 (CN) .......................... 2016 1 0946945

(51) Int. Cl.
*G06F 1/16* (2006.01)
*G06F 21/36* (2013.01)
(Continued)

(52) U.S. Cl.
CPC .......... *G06F 1/1652* (2013.01); *G06F 1/1626* (2013.01); *G06F 1/1694* (2013.01);
(Continued)

(58) Field of Classification Search
CPC .... G06F 1/1652; G06F 1/1626; G06F 1/1694; G06F 21/36; G06F 21/44; G06F 21/84;
(Continued)

(56) References Cited

U.S. PATENT DOCUMENTS

2010/0082998 A1* 4/2010 Kohavi .............. G06F 21/36
713/182
2011/0298691 A1* 12/2011 DeLuca .............. G06F 21/36
345/1.3
(Continued)

FOREIGN PATENT DOCUMENTS

| CN | 102890761 A | 1/2013 |
| CN | 105323066 A | 2/2016 |
| CN | 105323218 A | 2/2016 |

OTHER PUBLICATIONS

The First Office Action in Chinese patent application No. 201610946945.1, dated Sep. 29, 2018.
(Continued)

*Primary Examiner* — Michael Pyzocha
*Assistant Examiner* — Zoha Piyadehghibi Tafaghodi
(74) *Attorney, Agent, or Firm* — Jun He Law Offices P.C.; James J. Zhu

(57) ABSTRACT

A verification method, device and computer-readable storage medium based on a flexible display screen are provided. The method includes: generating a verification code, and dividing the verification code into a plurality of parts; displaying the plurality of parts on the flexible display screen separately; detecting deformation of the flexible display screen, and determining a splicing result of the plurality of parts based on the deformation of the flexible display screen; and determining a verification result based on the splicing result.

17 Claims, 10 Drawing Sheets

(51) Int. Cl.
    *G06F 21/44* (2013.01)
    *G06F 21/84* (2013.01)
    *G09F 9/30* (2006.01)
    *H04L 29/06* (2006.01)
    *H04M 1/02* (2006.01)
    *H04M 1/67* (2006.01)
    *G09G 5/00* (2006.01)
    *G09G 3/00* (2006.01)
    *G09G 3/20* (2006.01)

(52) U.S. Cl.
CPC .............. *G06F 21/36* (2013.01); *G06F 21/44* (2013.01); *G06F 21/84* (2013.01); *G09F 9/301* (2013.01); *G09G 3/003* (2013.01); *G09G 3/20* (2013.01); *G09G 5/00* (2013.01); *H04L 63/10* (2013.01); *H04L 63/1441* (2013.01); *H04M 1/0268* (2013.01); *H04M 1/67* (2013.01); *G06F 2221/2103* (2013.01); *G06F 2221/2133* (2013.01); *G09G 2320/068* (2013.01); *G09G 2340/14* (2013.01); *G09G 2380/02* (2013.01)

(58) Field of Classification Search
CPC ..... G06F 2221/2103; G06F 2221/2133; G09F 9/301; G09G 3/003; G09G 3/20; G09G 5/00; G09G 2320/068; G09G 2340/14; G09G 2380/02; H04L 63/10; H04L 63/1441; H04M 1/0268; H04M 1/67
USPC ........................................................... 726/19
See application file for complete search history.

(56) References Cited

U.S. PATENT DOCUMENTS

| | | | |
|---|---|---|---|
| 2012/0090028 A1* | 4/2012 | Lapsley | H04L 63/08 726/22 |
| 2012/0297190 A1* | 11/2012 | Shen | H04L 9/0866 713/168 |
| 2015/0347787 A1 | 12/2015 | Hamilton et al. | |
| 2016/0055329 A1* | 2/2016 | Akula | G06F 21/36 726/7 |
| 2016/0232338 A1* | 8/2016 | Guo | H04L 9/3271 |

OTHER PUBLICATIONS

Extended European Search Report of EP Application No. 17162982.7 dated Aug. 23, 2017.
Sana Maqsood et al: "Bend Passwords", Personal and Ubiquitous Computing, Springer Verlag, London, GB, vol. 20, No. 4, Aug. 1, 2016, pp. 573-600.

* cited by examiner

VERIFICATION METHOD, DEVICE AND COMPUTER-READABLE STORAGE MEDIUM BASED ON A FLEXIBLE DISPLAY SCREEN

CROSS-REFERENCE TO RELATED APPLICATION

This application is based on and claims priority to Chinese Patent Application No. 201610946945.1, filed on Oct. 26, 2016, which is incorporated herein by reference in its entirety.

FIELD

The present disclosure relates to a technical field of display screen, and more particularly, to a verification method, device and computer-readable storage medium based on a flexible display screen.

BACKGROUND

A verification code, CAPTCHA ("Completely Automated Public Turing test to tell Computers and Humans Apart") is a public fully automatic program for distinguishing a user is a computer or a human being. The verification code may effectively prevent a client from cracking user's password with malicious attack using a machine, so as to effectively reduce system security risk. FIG. 1A is a schematic diagram illustrating a typical verification method using character verification. FIG. 1B is a schematic diagram illustrating a typical verification method using image verification. The principle of the verification methods shown in FIG. 1A and 1B is that the server has recorded the metadata of the shown image, and with the shown image, the client machine can hardly retrace the meaning of the image, but human eyes and human brain can easily recognize the meaning of the image, therefore the client is a human being or a machine may be effectively distinguished, so as to prevent a client machine from cracking passwords with malicious attack.

With the development of flexible material, the flexible display screens start to emerge in the market. FIG. 2A and FIG. 2B are schematic diagrams illustrating a handheld device with a flexible display screen. With the gradual improvement of the flexibility of the flexible display screen, the shape of the flexible screen is more and more flexible, as shown in FIG. 2B, the flexible display screen may be fully folded.

Typically, the verification method based on a flexible display screen is the same with the verification method based on a non-flexible display screen, which doesn't make full use of the deformable and bendable property of the flexible display screen to achieve the verification.

SUMMARY

A verification method, device and computer-readable storage medium based on a flexible display screen are provided.

According to a first aspect of embodiments of the present disclosure, a verification method based on a flexible display screen is provided, and the method includes: generating a verification code, and dividing the verification code into a plurality of parts; displaying the plurality of parts on the flexible display screen separately; detecting deformation of the flexible display screen, and determining a splicing result of the plurality of parts based on the deformation of the flexible display screen; and determining a verification result based on the splicing result.

According to a second aspect of embodiments of the present disclosure, a verification device based on a flexible display screen is provided, and the device includes: a processor; and a memory for storing instructions executable by the processor; wherein the processor is configured to: generate a verification code, and divide the verification code into a plurality of parts; display the plurality of parts on the flexible display screen separately; detect deformation of the flexible display screen, and determine a splicing result of the plurality of parts based on the deformation of the flexible display screen; and determine a verification result based on the splicing result.

According to a third aspect of embodiments of the disclosure, a non-transitory computer-readable storage medium having instructions stored thereon is provided. The instructions, when executed by a processor of a terminal, cause the terminal to perform a verification method based on a flexible display screen. The method may include: generating a verification code, and dividing the verification code into a plurality of parts; displaying the plurality of parts on the flexible display screen separately; detecting deformation of the flexible display screen, and determining a splicing result of the plurality of parts based on the deformation of the flexible display screen; and determining a verification result based on the splicing result.

It is to be understood that the above general description and the following detailed description are merely for the purpose of illustration and explanation, and are not intended to limit the scope of the protection of the disclosure.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DETAILED DESCRIPTION

Reference will now be made in detail to example embodiments, examples of which are illustrated in the accompanying drawings. The following description refers to the accompanying drawings in which same numbers in different drawings represent same or similar elements unless otherwise described. The implementations set forth in the following description of example embodiments do not represent all implementations consistent with the present disclosure. Instead, they are merely examples of devices and methods consistent with aspects related to the present disclosure as recited in the appended claims.

Figure 1A:
FIG. 1A is a schematic diagram illustrating a verification method using character verification.
Figure 1B:
FIG. 1B is a schematic diagram illustrating a verification method using image verification.
Figure 2A:
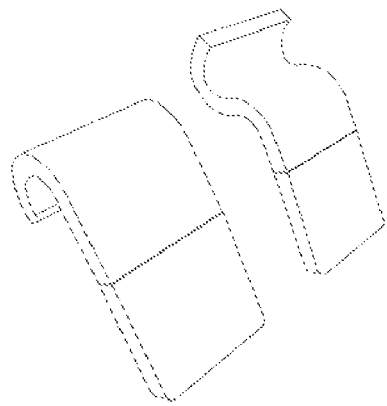
FIG. 2A is a schematic diagram illustrating a handheld device with a flexible display screen.
Figure 2B:
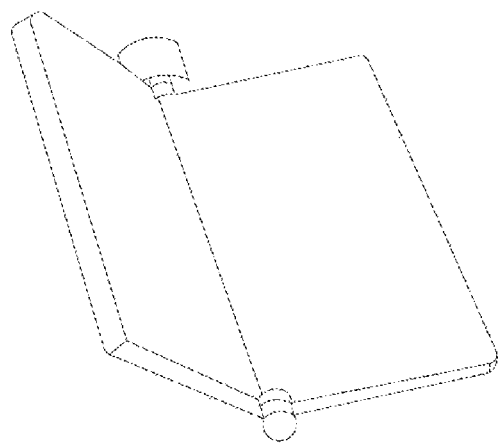
FIG. 2B is a schematic diagram illustrating a handheld device with a flexible display screen.
Figure 3:
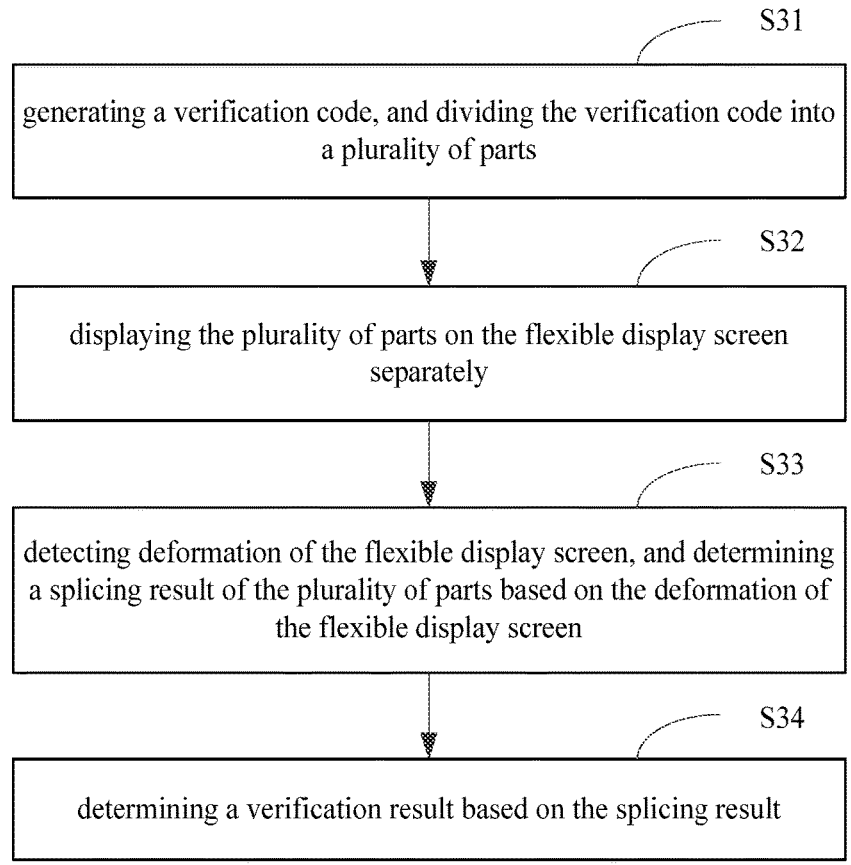
FIG. 3 is a flow diagram illustrating a verification method based on a flexible display screen according to an exemplary embodiment.

FIG. 3 is a flow diagram illustrating a verification method based on a flexible display screen according to an exemplary embodiment. The execution subject of the method may be a terminal device which has a flexible display screen, and as shown in FIG. 3, the method may include the following steps.

In step 31, a verification code is generated, and the verification code is divided into a plurality of parts.

The verification method based on a flexible display screen provided in the embodiment may be applied to various scenarios in which the verification code is needed. For example, when it is detected that a geographical location of the login system of the terminal device is abnormal or a password is incorrectly input for many times, the verification code may be enabled to reduce the probability of unauthorized access to the system. For another example, in order to improve the system security, the verification may be performed using the verification code when a user login to a website (e.g., a train ticket booking website) or when it is detected that an access traffic is abnormal (for example, the verification may be performed using the verification code when it's detected that the client makes research requests too soon). For another example, the verification may be performed using the verification code where a user needs to unlock a screen or where a user needs to prevent misoperations when answering a phone call.

The verification code may be a clear and readable character, character string or image and the like, which is not limited herein.

In the embodiment, when performing the verification using the verification code, the verification code may be generated or may be extracted from a verification code base, and the verification code is divided into a plurality of parts. For example, if the verification code is a Chinese character, it may be divided based on the components of Chinese characters.

In one example of the embodiment, the number of the divided parts may be preset as N, wherein N is an integer greater than or equal to 2.

In step S32, the plurality of parts are displayed on the flexible display screen separately.

In one embodiment, after the plurality of parts are displayed on the flexible display screen separately, the user may flex the flexible display screen to splice the plurality of parts using the bendable property of the flexible display screen.

In step S33, deformation of the flexible display screen is detected, and a splicing result of the plurality of parts is determined based on the deformation of the flexible display screen.

There are various technologies for detecting the deformation of the flexible display screen. For example, the deformation of the flexible display screen may be detected using Microsoft flexible transparent technology (FlexSense).

In step S34, the verification result is determined based on the splicing result.

For example, the verification result may be determined based on the perfection degree of the splice of the plurality parts.

A more intuitive and tactile method for inputting the verification code provided by the embodiment may perform the verification using the deformable and bendable property of the flexible display screen, which may improve the flexible and security of the verification.

Figure 4:
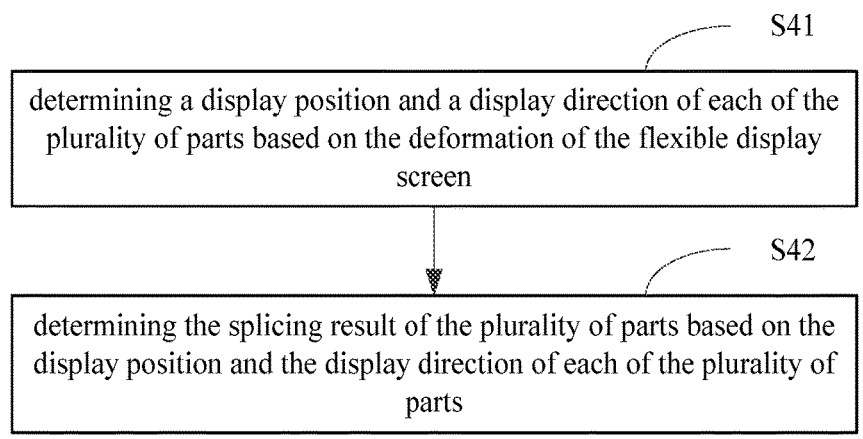
FIG. 4 is a flow diagram illustrating step S33 in a verification method based on a flexible display screen according to an example of an exemplary embodiment, in which a splicing result of the plurality of parts is determined based on the deformation of the flexible display screen.

FIG. 4 is a flow diagram illustrating step S33 in a verification method based on a flexible display screen according to an example of an exemplary embodiment, in which a splicing result of the plurality of parts is determined based on the deformation of the flexible display screen. As shown in FIG. 4, the determining the splicing result of the plurality of parts based on the deformation of the flexible display screen may include the flowing steps.

In step S41, a display position and a display direction of each of the plurality of parts are determined based on the deformation of the flexible display screen.

In step S42, the splicing result of the plurality of parts is determined based on the display position and the display direction of each of the plurality of parts.

In this example, the display position and the display direction of each of the plurality of parts are determined based on the deformation of the flexible display screen, and the splicing result of the plurality of parts is determined based on the display position and the display direction of each of the plurality of parts, so as to ensure the accuracy of the determined splicing result.

Figure 5:
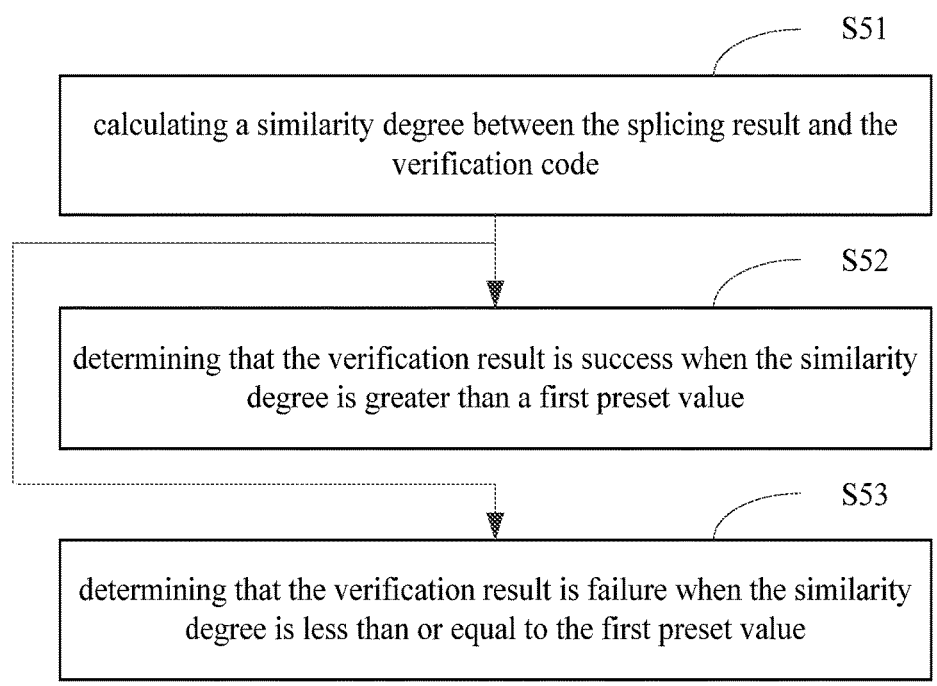
FIG. 5 is a flow diagram illustrating step 34 in a verification method based on a flexible display screen according to an example of an exemplary embodiment.

FIG. 5 is a flow diagram illustrating step 34 in a verification method based on a flexible display screen according to an example of an exemplary embodiment. As shown in FIG. 5, the determining the verification result based on the splicing result may include the flowing steps.

In step S51, a similarity degree between the splicing result and the verification code is calculated.

In this example, a first image may be determined based on the splicing result, a second image may be determined based on the verification code, and then the similarity degree between the first image and the second image may be calculated, such that the similarity between the first image and the second image may be determined as the similarity between the splicing result and the verification code. It should be noted that there are various technologies for calculating the similarity degree among images, which will not be repeated herein.

In step S52, it is determined that the verification result is success when the similarity degree is greater than a first preset value.

In step S53, it is determined that the verification result is failure when the similarity degree is less than or equal to the first preset value.

In this example, the success of the verification is determined based on the similarity degree, which may improve the reliability of the verification.

Figure 6:
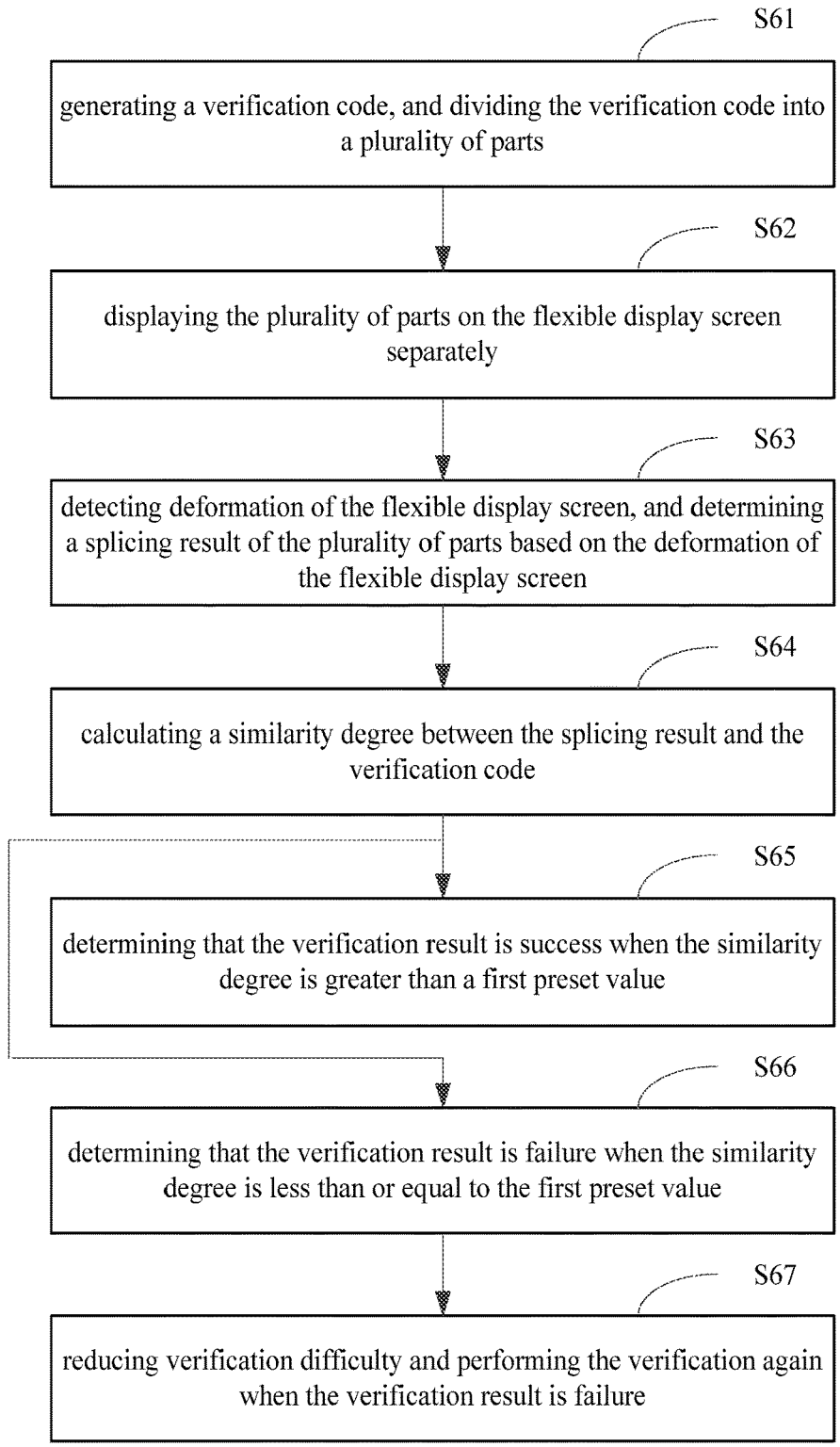
FIG. 6 is a flow diagram illustrating a verification method based on a flexible display screen according to an example of an exemplary embodiment.

FIG. 6 is a flow diagram illustrating a verification method based on a flexible display screen according to an example of an exemplary embodiment. As shown in FIG. 6, the method may include the following steps.

In step S61, a verification code is generated, and the verification code is divided into a plurality of parts.

In step S62, the plurality of parts is displayed on the flexible display screen separately.

In step S63, deformation of the flexible display screen is detected, and a splicing result of the plurality of parts is determined based on the deformation of the flexible display screen.

In step S64, a similarity degree between the splicing result and the verification code is calculated.

In step S65, it is determined that the verification result is success when the similarity degree is greater than a first preset value.

In step S66, it is determined that the verification result is failure when the similarity degree is less than or equal to the first preset value.

In step S67, verification difficulty is reduced and the verification is performed again when the verification result is failure.

With respect to descriptions for steps S61, S62 and S63, see the descriptions for steps S31, S32 and S33, and with respect to descriptions for steps S64, S65 and S66, see the descriptions for steps S51, S52 and S53.

For example, when the verification is performed again, the verification difficulty may be reduced by reducing the number of the divided parts of the verification code or employing characters with simper strokes or a simpler image as the verification code. In the example, verification difficulty is reduced and the verification is performed again when the verification result is failure, such that when the user flexed the flexible display screen by error or had a misoperation, another verification opportunity may be provided, and the verification difficulty may be reduced accordingly when the original verification is more difficult, which may improve user experience.

Figure 7:
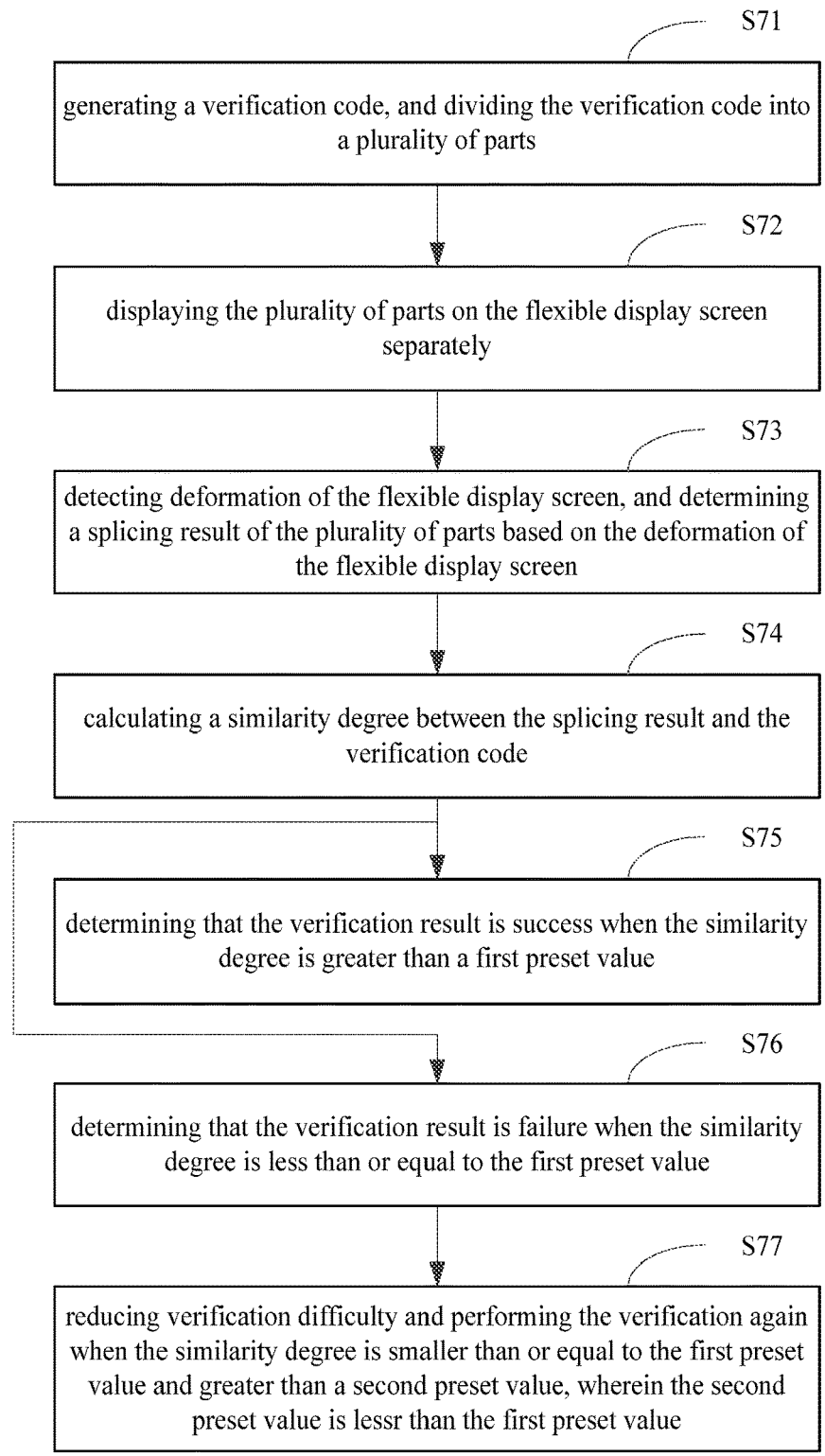
FIG. 7 is a flow diagram illustrating a verification method based on a flexible display screen according to an example of an exemplary embodiment.

FIG. 7 is a flow diagram illustrating a verification method based on a flexible display screen according to an example of an exemplary embodiment. As shown in FIG. 7, the method may include the following steps.

In step S71, a verification code is generated, and the verification code is divided into a plurality of parts.

In step S72, the plurality of parts is displayed on the flexible display screen separately.

In step S73, deformation of the flexible display screen is detected, and a splicing result of the plurality of parts is determined based on the deformation of the flexible display screen.

In step S74, a similarity degree between the splicing result and the verification code is calculated.

In step S75, it is determined that the verification result is success when the similarity degree is greater than a first preset value.

In step S76, it is determined that the verification result is failure when the similarity degree is less than or equal to the first preset value.

In step S77, verification difficulty is reduced and the verification is performed again when the similarity degree is less than or equal to the first preset value and greater than a second preset value, wherein the second preset value is less than the first preset value.

With respect to descriptions for steps S71, S72 and S73, see the descriptions for steps S31, S32 and S33, and with respect to descriptions for steps S74, S75 and S76, see the descriptions for steps S51, S52 and S53.

For example, when the verification is performed again, the verification difficulty may be reduced by reducing the number of the divided parts of the verification code or employing characters with simper strokes or a simpler image as the verification code. In the example, verification difficulty is reduced and the verification is performed again when the similarity degree is less than or equal to the first preset value and greater than a second preset value, such that when the user flexed the flexible display screen by error or had a misoperation, another verification opportunity may be provided, and the verification difficulty may be reduced adaptively when the original verification is more difficult, which may improve the user experience. In the example, a malicious attack by a machine may be determined and the verification cannot be performed again in a preset period when the similarity is less than or equal to the second preset value.

Figure 8:
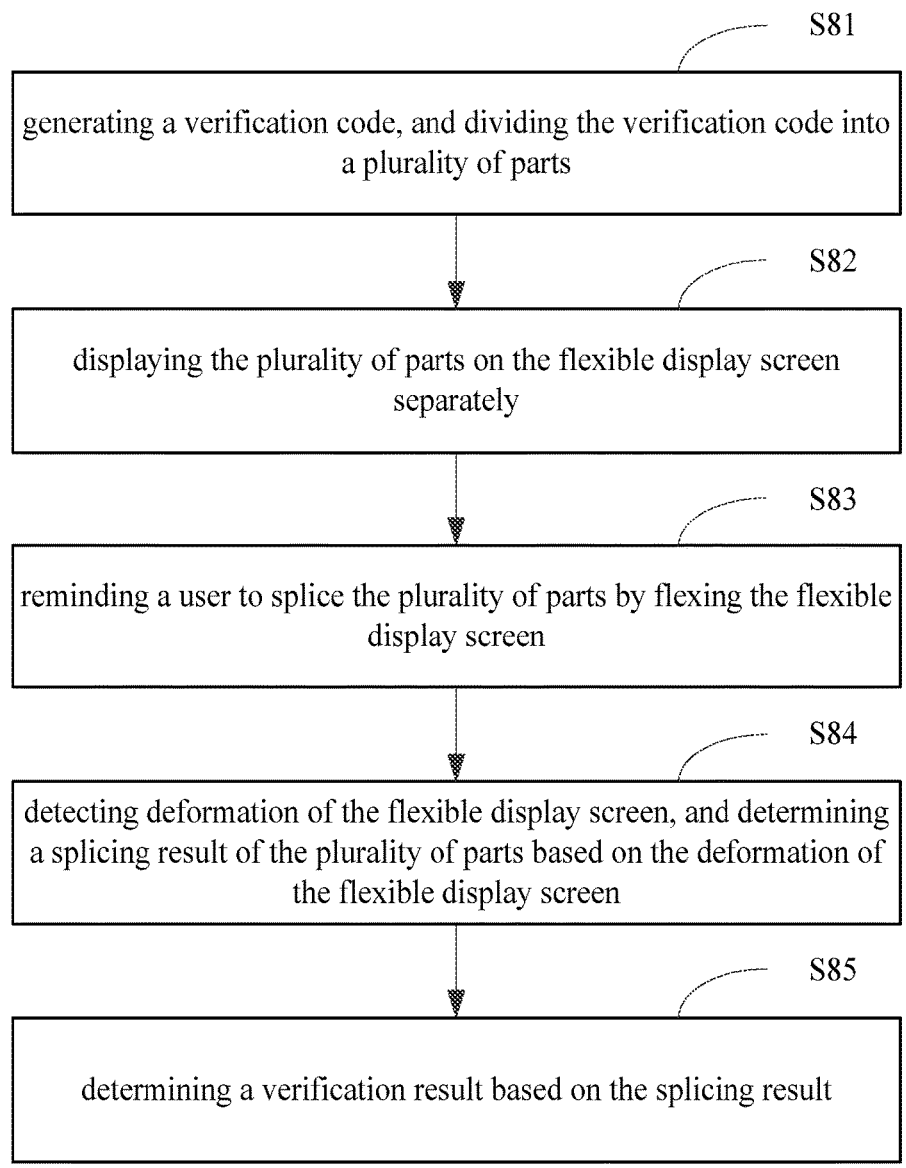
FIG. 8 is a flow diagram illustrating a verification method based on a flexible display screen according to an example of an exemplary embodiment.

FIG. 8 is a flow diagram illustrating a verification method based on a flexible display screen according to an example of an exemplary embodiment. As shown in FIG. 8, the method may include the following steps.

In step S81, a verification code is generated, and the verification code is divided into a plurality of parts.

In step S82, the plurality of parts is displayed on the flexible display screen separately.

In step S83, a user is reminded to splice the plurality of parts by flexing the flexible display screen.

In step S84, deformation of the flexible display screen is detected, and a splicing result of the plurality of parts is determined based on the deformation of the flexible display screen.

In step S85, a verification result is determined based on the splicing result With respect to descriptions for steps S81, S82, S83 and S84, see the descriptions for steps S31, S32, S33 and S34.

In the example, the user may be reminded by words or voice to splice the plurality of parts displayed separately by flexing the flexible display screen. In the example, the user who is not familiar with the verification using the flexible display screen may receive a reminder, so as to improve the user experience.

In one possible implementation, the verification code is a character verification code or an image verification code.

Figure 9:
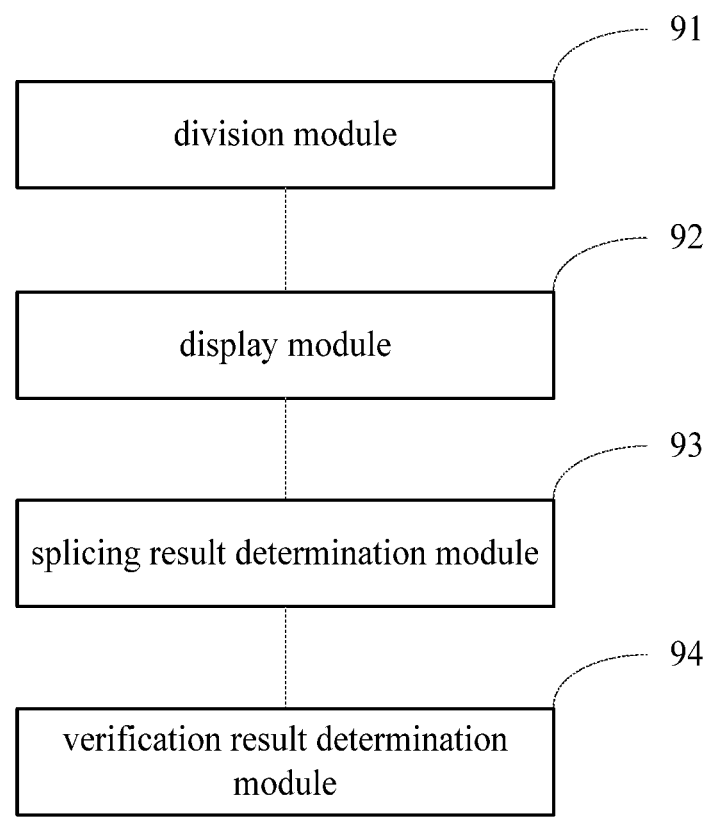
FIG. 9 is a block diagram illustrating a verification device based on a flexible display screen according to an exemplary embodiment.

FIG. 9 is a block diagram illustrating a verification device based on a flexible display screen according to an exemplary embodiment. As shown in FIG. 9, the device may include a division module 91, a display module 92, a splicing result determination module 93 and a verification result determination module 94. The division module 91 is configured to generate a verification code and divide the verification code into a plurality of parts. The display module 92 is configured to display the plurality of parts on the flexible display screen separately. The splicing result determination module 93 is configured to detect deformation of the flexible display screen and determine a splicing result of the plurality of parts based on the deformation of the flexible display screen. The verification result determination module 94 is configured to determine a verification result based on the splicing result.

Figure 10:
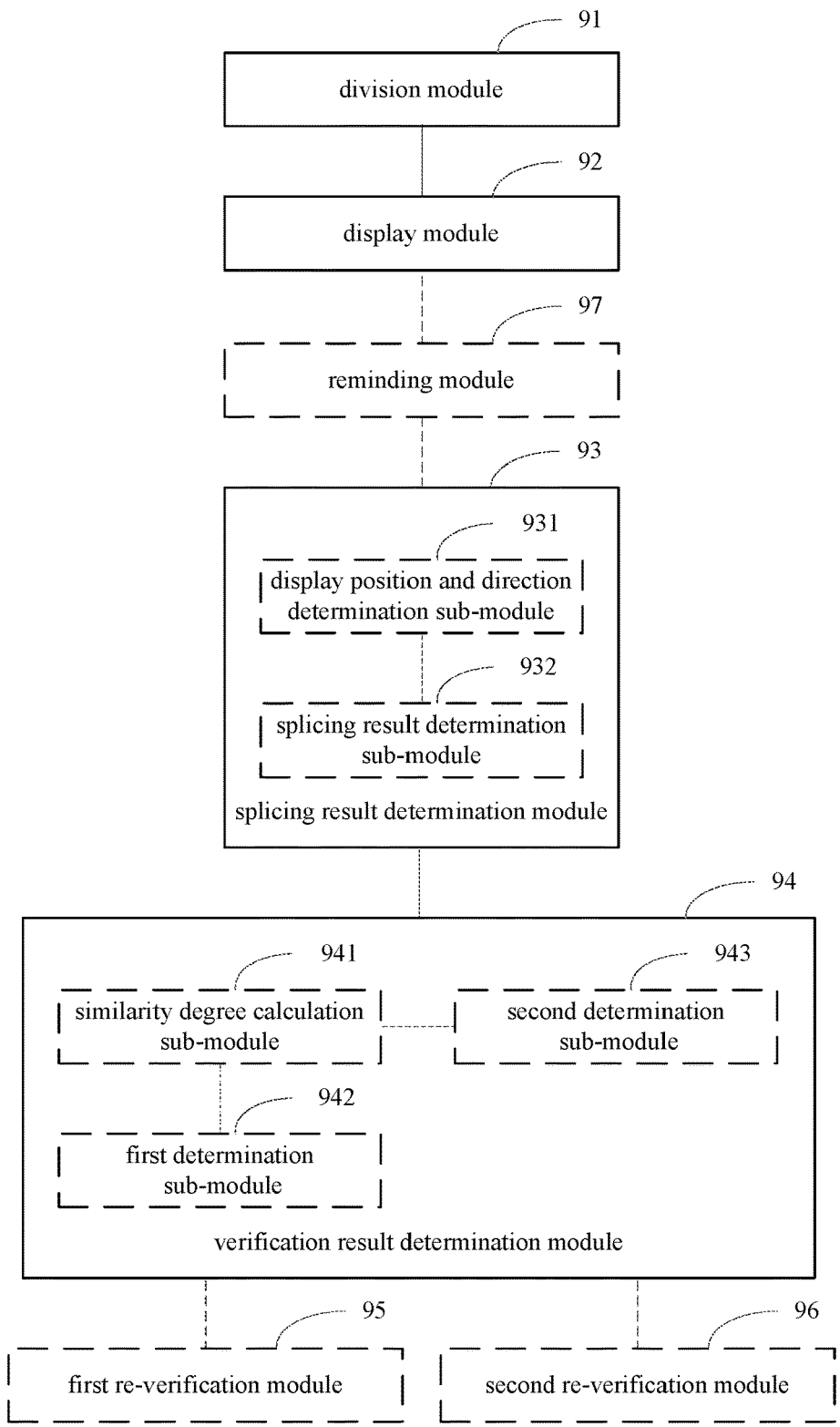
FIG. 10 is a block diagram illustrating a verification device based on a flexible display screen according to an example of an exemplary embodiment.

FIG. 10 is a block diagram illustrating a verification device based on a flexible display screen according to an example of an exemplary embodiment.

As shown in FIG. 10, in one possible implementation, the splicing result determination module 93 may include a display position and direction determination sub-module 931 configured to determine a display position and a display direction of each of the plurality of parts based on the deformation of the flexible display screen; and a splicing result determination sub-module 932 configured to determine the splicing result of the plurality of parts based on the display position and the display direction of each of the plurality of parts.

In one possible implementation, the verification result determination module 94 may include: a similarity degree calculation sub-module 941 configured to calculate a similarity degree between the splicing result and the verification code; a first determination sub-module 942 configured to determine that the verification result is success when the similarity degree is greater than a first preset value; a second determination sub-module 943 configured to determine that the verification result is failure when the similarity degree is less than or equal to the first preset value.

In one possible implementation, the device further include a first re-verification module 95 configured to reduce verification difficulty and perform the verification again when the verification result is failure.

In one possible implementation, the device further include a second re-verification module 96 configured to reduce verification difficulty and perform the verification again when the similarity degree is less than or equal to the first preset value and greater than a second preset value, wherein the second preset value is less than the first preset value.

In one possible implementation, to reduce the verification difficulty may include to reduce the number of the divided parts of the verification code to reduce the verification difficulty.

In one possible implementation, the device further include a reminding module 97 configured to remind a user to splice the plurality of parts by flexing the flexible display screen.

In one possible implementation, the verification code is a character verification code or an image verification code.

With respect to the device in the above embodiments, specific implementation of the operation performed by each of the modules of the device in the above embodiments has been described in the related method embodiments, which will not be repeated herein.

The verification device based on a flexible display screen may perform the verification using the deformable and bendable property of the flexible display screen, which improves the flexibility and security of the verification.

Figure 11:
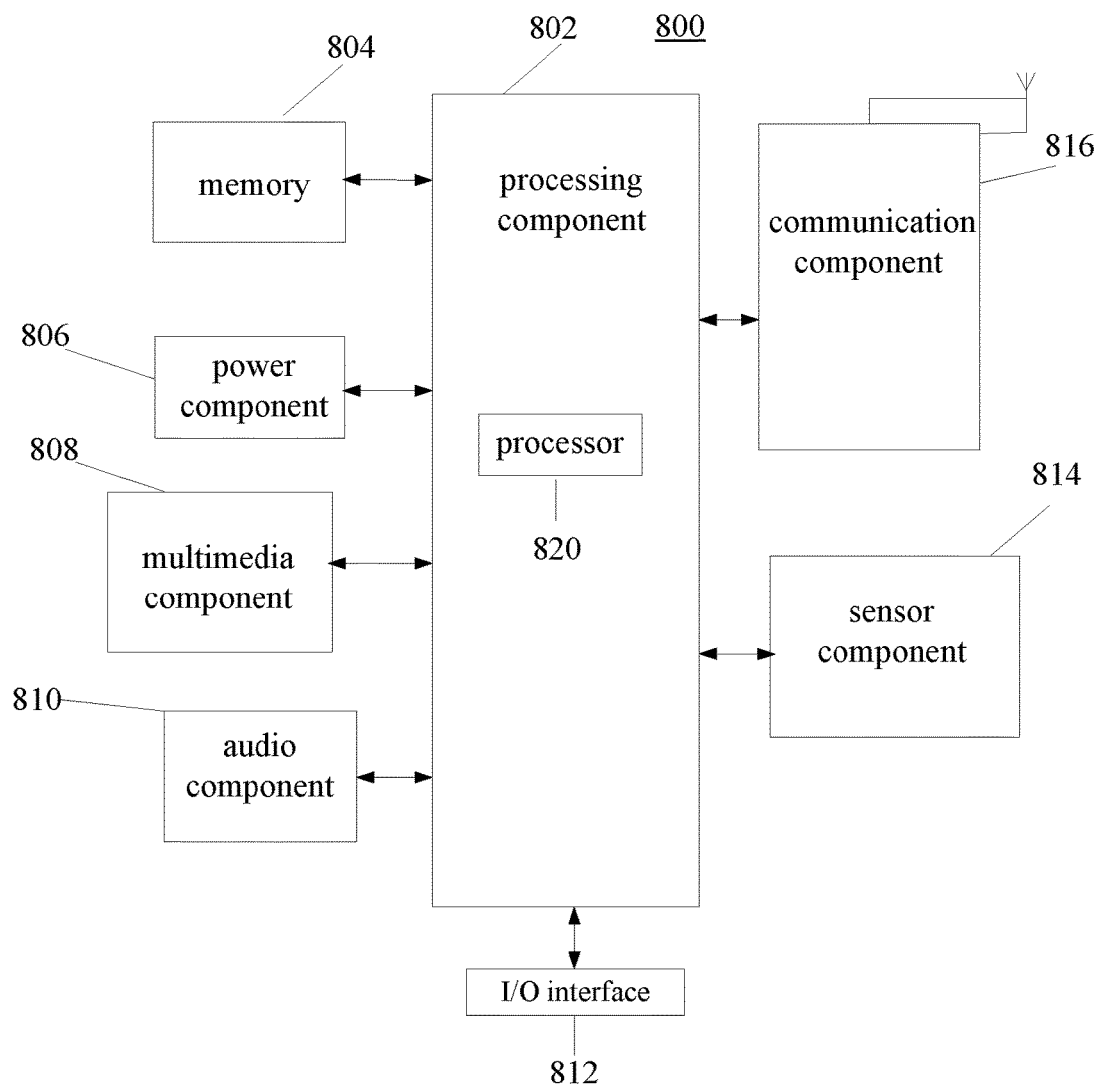
FIG. 11 is a block diagram illustrating a verification device 800 based on a flexible display screen according to an exemplary embodiment.

FIG. 11 is a block diagram illustrating a verification device 800 based on a flexible display screen according to an exemplary embodiment. The device 800 may be a mobile phone, a computer, a digital broadcast terminal, a message transceiver, a game console, a tablet device, a medical equipment, a fitness equipment, a personal digital assistant, and the like.

Referring to FIG. 11, the device 800 may include one or more of the following components: a processing component 802, a memory 804, a power component 806, a multimedia component 808, an audio component 810, an input/output (I/O) interface 812, a sensor component 814, and a communication component 816.

The processing component 802 typically controls overall operations of the device 800, such as the operations associated with display, telephone calls, data communications, camera operations, and recording operations. The processing component 802 may include one or more processors 820 to execute instructions to perform all or part of the steps in the above described methods. Moreover, the processing component 802 may include one or more modules which facilitate the interaction between the processing component 802 and other components. For instance, the processing component 802 may include a multimedia module to facilitate the interaction between the multimedia component 808 and the processing component 802.

The memory 804 is configured to store various types of data to support the operation of the device 800. Examples of such data may include instructions for any applications or methods operated on the device 800, contact data, phonebook data, messages, pictures, video, etc. The memory 804 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 806 provides power to various components of the device 800. The power component 806 may include a power management system, one or more power sources, and any other components associated with the generation, management, and distribution of power in the device 800.

The multimedia component 808 includes a screen providing an output interface between the device 800 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also detect a period of time and a pressure associated with the touch or swipe action. In some embodiments, the multimedia component 808 includes a front camera and/or a rear camera. The front camera and/or the rear camera may receive an external multimedia datum while the device 800 is in an operation mode, such as a photographing mode or a video mode. Each of the front camera and the rear camera may be a fixed optical lens system or have focus and optical zoom capability.

The audio component 810 is configured to output and/or input audio signals. For example, the audio component 810 includes a microphone ("MIC") configured to receive an external audio signal when the device 800 is in an operation mode, such as a call mode, a recording mode, and a voice recognition mode. The received audio signal may be further stored in the memory 804 or transmitted via the communication component 816. In some embodiments, the audio component 810 further includes a speaker to output audio signals.

The I/O interface 812 provides an interface between the processing component 802 and peripheral interface modules, such as a keyboard, a click wheel, buttons, and the like. The buttons may include, but are not limited to, a home button, a volume button, a starting button, and a locking button.

The sensor component 814 includes one or more sensors to provide status assessments of various aspects of the device 800. For instance, the sensor component 814 may detect an open/closed status of the device 800, relative positioning of components, e.g., the display and the keypad, of the device 800, a change in position of the device 800 or a component of the device 800, a presence or absence of user contact with the device 800, an orientation or an acceleration/deceleration of the device 800, and a change in temperature of the device 800.

The sensor component 814 may include a proximity sensor configured to detect the presence of nearby objects without any physical contact. The sensor component 814 may also include a light sensor, such as a CMOS or CCD image sensor, for use in imaging applications. In some embodiments, the sensor component 814 may also include an accelerometer sensor, a gyroscope sensor, a magnetic sensor, a distance sensor, a pressure sensor, or a temperature sensor.

The communication component 816 is configured to facilitate communication, wired or wirelessly, between the device 800 and other devices. The device 800 can access a wireless network based on a communication standard, such as WiFi, 2G, or 3G, or a combination thereof In one exemplary embodiment, the communication component 816 receives a broadcast signal or broadcast associated information from an external broadcast management system via a broadcast channel. In one exemplary embodiment, the communication component 816 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the device 800 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium including instructions, such as the memory 804 including instructions executable by the processor 820 in the device 800 to perform the above-described methods. For example, the non-transitory computer-readable storage medium may be a ROM, a RAM, a CD-ROM, a magnetic tape, a floppy disc, an optical data storage device, and the like.

Other embodiments will be apparent to those skilled in the art from consideration of the specification and practice of the disclosure disclosed here. This application is intended to cover any variations, uses, or adaptations of the invention following the general principles thereof and including such departures from the present disclosure as come within known or customary practice in the art. The specification and embodiments are merely considered to be exemplary and the substantive scope and spirit of the disclosure is limited only by the appended claims.

It should be understood that the disclosure is not limited to the precise structure as described above and shown in the figures, but can have various modification and alternations without departing from the scope of the disclosure. The scope of the disclosure is limited only by the appended claims.

What is claimed is:

1. A verification method based on a flexible display screen, the method comprising:
   generating a verification code, and dividing the verification code into a plurality of parts;
   displaying the plurality of parts on the flexible display screen separately;
   detecting deformation of the flexible display screen, and determining a splicing result of the plurality of parts based on the deformation of the flexible display screen; and
   determining a verification result based on the splicing result;
   wherein the determining the verification result based on the splicing result comprises:
   calculating a similarity degree between the splicing result and the verification code;
   determining that the verification result is success when the similarity degree is greater than a first preset value; and
   determining that the verification result is failure when the similarity degree is less than or equal to the first preset value.

2. The verification method of claim 1, wherein the determining the splicing result of the plurality of parts based on the deformation of the flexible display screen comprises:
   determining a display position and a display direction of each of the plurality of parts based on the deformation of the flexible display screen; and
   determining the splicing result of the plurality of parts based on the display position and the display direction of each of the plurality of parts.

3. The verification method of claim 1, after determining the verification result based on the splicing result, the method further comprising:
   reducing verification difficulty and performing the verification again when the verification result is failure.

4. The verification method of claim 3, wherein the reducing the verification difficulty comprises:
   reducing the number of the divided parts of the verification code to reduce the verification difficulty.

5. The verification method of claim 1, wherein after determining the verification result based on the splicing result, the method further comprising:
   reducing verification difficulty and performing the verification again when the similarity degree is less than or equal to the first preset value and greater than a second preset value, wherein the second preset value is less than the first preset value.

6. The verification method of claim 5, wherein the reducing the verification difficulty comprises:
   reducing the number of the divided parts of the verification code to reduce the verification difficulty.

7. The verification method of claim 1, wherein after displaying the plurality of parts on the flexible display screen separately, the method further comprising:
   reminding a user to splice the plurality of parts by flexing the flexible display screen.

8. The verification method of claim 1, wherein the verification code is a character verification code or an image verification code.

9. A verification device based on a flexible display screen, the device comprising:
   a processor; and
   a memory for storing instructions executable by the processor;
   wherein the processor is configured to:
   generate a verification code and divide the verification code into a plurality of parts;
   display the plurality of parts on the flexible display screen separately;
   detect deformation of the flexible display screen and determine a splicing result of the plurality of parts based on the deformation of the flexible display screen; and determine a verification result based on the splicing result;

wherein the processor configured to determine the verification result based on the splicing result is further configured to:

calculate a similarity degree between the splicing result and the verification code;

determine that the verification result is success when the similarity degree is greater than a first preset value; and determine that the verification result is failure when the similarity degree is less than or equal to the first preset value.

10. The verification device of claim 9, wherein the processor configured to determine the splicing result of the plurality of parts based on the deformation of the flexible display screen is further configured to:

determine a display position and a display direction of each of the plurality of parts based on the deformation of the flexible display screen; and determine the splicing result of the plurality of parts based on the display position and the display direction of each of the plurality of parts.

11. The verification device of claim 9, wherein the processor is further configured to:

reduce verification difficulty and perform the verification again when the verification result is failure.

12. The verification device of claim 11, wherein the processor configured to reduce verification difficulty is further configured to:

reduce the number of the divided parts of the verification code to reduce the verification difficulty.

13. The verification device of claim 9, wherein the processor is further configured to:

reduce verification difficulty and perform the verification again when the similarity degree is less than or equal to the first preset value and greater than a second preset value, wherein the second preset value is less than the first preset value.

14. The verification device of claim 13, wherein the processor configured to reduce verification difficulty is further configured to:

reduce the number of the divided parts of the verification code to reduce the verification difficulty.

15. The verification device of claim 9, wherein the processor is further configured to:

remind a user to splice the plurality of parts by flexing the flexible display screen.

16. The verification device of claim 9, wherein the verification code is a character verification code or an image verification code.

17. A non-transitory computer-readable storage medium having instructions stored thereon, the instructions, when executed by a processor, cause the processor to perform a verification method based on a flexible display screen, the method comprising:

generating a verification code, and divide the verification code into a plurality of parts;

displaying the plurality of parts on the flexible display screen separately;

detecting deformation of the flexible display screen, and determine a splicing result of the plurality of parts based on the deformation of the flexible display screen; and determining a verification result based on the splicing result;

wherein the determining the verification result based on the splicing result comprises:

calculating a similarity degree between the splicing result and the verification code;

determining that the verification result is success when the similarity degree is greater than a first preset value; and determining that the verification result is failure when the similarity degree is less than or equal to the first preset value.

* * * * *